(12) United States Patent
Anders et al.

(10) Patent No.: US 10,572,112 B2
(45) Date of Patent: Feb. 25, 2020

(54) DYNAMIC SYSTEM AND METHOD FOR CONTENT AND TOPIC BASED SYNCHRONIZATION DURING PRESENTATIONS

(71) Applicant: International Business Machines Corporation, Armonk, NY (US)

(72) Inventors: Kelley Anders, East New Market, MD (US); Jonathan Dunne, Dungarvan (IE); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/850,940

(22) Filed: Dec. 21, 2017

(65) Prior Publication Data

US 2019/0129592 A1    May 2, 2019

Related U.S. Application Data

(63) Continuation of application No. 15/794,397, filed on Oct. 26, 2017.

(51) Int. Cl.
*G06F 3/0484* (2013.01)
*G06F 17/27* (2006.01)
(Continued)

(52) U.S. Cl.
CPC ............ *G06F 3/0484* (2013.01); *G06F 3/167* (2013.01); *G06F 16/3344* (2019.01);
(Continued)

(58) Field of Classification Search
CPC .. G06F 3/0484; G06F 3/167; G06F 17/30684; G06F 17/2785
See application file for complete search history.

(56) References Cited

U.S. PATENT DOCUMENTS 6,578,040 B1    6/2003  Syeda-Mahmood
7,831,910 B2   11/2010  Liu et al.
(Continued)

OTHER PUBLICATIONS

Unknown, "Alchemy Language", IBM Watson Developer Cloud, https://www.ibm.com/watson/developercloud/alchemy-language.html, 2017, 3 pgs.
(Continued)

*Primary Examiner* — Daeho D Song
(74) *Attorney, Agent, or Firm* — Michael P. O'Keefe; Maxine L. Barasch; Keohane & D'Alessandro PLLC

(57) ABSTRACT

Disclosed embodiments provide techniques for automatically synchronizing a visual presentation with a live presenter. Visual presentation slides are preprocessed to determine one or more topics for each slide. A topic index contains one or more topics corresponding to slides of the presentation. As a presenter provides a verbal presentation for corresponding slides, natural language processing analyzes the verbal presentation and creates one or more temporal verbal topic categories. The temporal verbal topic categories are used to search the topic index to find one or more slides that best match the current temporal verbal topic categories. In this way, the slides can automatically follow the discussion of the presenter, enabling improved presentations that can enhance the user experience, increase audience engagement, and improve the dissemination of information.

16 Claims, 14 Drawing Sheets

(51) Int. Cl.
*G06F 17/30* (2006.01)
*G10L 15/22* (2006.01)
*G06F 3/16* (2006.01)
*G10L 15/18* (2013.01)
*G06F 16/33* (2019.01)

(52) U.S. Cl.
CPC ........ *G06F 17/278* (2013.01); *G06F 17/2785* (2013.01); *G10L 15/1815* (2013.01); *G10L 15/22* (2013.01)

(56) References Cited

U.S. PATENT DOCUMENTS

| | | | |
|---|---|---|---|
| 9,584,571 B2 | 2/2017 | Scherlis et al. | |
| 9,704,413 B2 | 7/2017 | Yoon et al. | |
| 2003/0065655 A1* | 4/2003 | Syeda-Mahmood | G09B 5/067 |
| 2003/0122863 A1* | 7/2003 | Dieberger | G06F 3/0483 715/730 |
| 2003/0236792 A1 | 12/2003 | Mangerie et al. | |
| 2005/0021331 A1* | 1/2005 | Huang | G10L 15/08 704/231 |
| 2008/0270138 A1* | 10/2008 | Knight | G10L 15/26 704/260 |
| 2010/0250241 A1* | 9/2010 | Iwahashi | G10L 15/1822 704/10 |
| 2010/0293469 A1 | 11/2010 | Khot et al. | |
| 2012/0029908 A1* | 2/2012 | Takamatsu | G06F 16/345 704/9 |
| 2013/0117111 A1* | 5/2013 | Dyor | G06F 3/0481 705/14.54 |
| 2014/0019133 A1* | 1/2014 | Bao | G10L 15/22 704/257 |
| 2014/0133836 A1* | 5/2014 | Burns | G11B 27/10 386/278 |
| 2015/0052440 A1* | 2/2015 | Livingston | G06F 3/04845 715/732 |
| 2016/0259778 A1* | 9/2016 | Cookson | G06F 17/2785 |
| 2016/0343351 A1* | 11/2016 | Chen | G06F 16/40 |
| 2017/0060857 A1* | 3/2017 | Imbruce | G06T 13/40 |
| 2018/0060028 A1* | 3/2018 | Carr | G06F 3/017 |

OTHER PUBLICATIONS

Unknown, "Logistic Regression", https://en.wikipedia.org/wiki/Logistic_regression, Dec. 1, 2016, 18 pgs.

Ross, Christopher et al., "Monitoring Methods for Topic Drift in Message Streams", http://reu.dimacs.rutgers.edu/, Jul. 23, 2003, 14 pgs.

Unknown, "Latent Dirichlet allocation", https://en.wikipedia_org/w/index.php?title=Latent_Dirichlet_allocation&oldid=753715247, Dec. 8, 2016, 6 pgs.

Daeho D. Song, USPTO Office Action, U.S. Appl. No. 15/794,397, dated May 2, 2019, 15 pages.

Daeho D. Song, USPTO Final Office Action, U.S. Appl. No. 15/794,397, dated Aug. 9, 2019, 16 pages.

* cited by examiner

1200

However, when the threshold criteria are met, you might find that the processor may determine whether the data storage medium unit has a threshold amount of free storage space available to perform diagnostic testing which may include for example intrusive error checking. Our goal is to have the computer storage space that includes for example sufficient disk sectors being available on a disk. When there is insufficient computer storage space, then the processor may continue operating the data storage medium unit until, for example, enough computer storage space becomes available.

DYNAMIC SYSTEM AND METHOD FOR CONTENT AND TOPIC BASED SYNCHRONIZATION DURING PRESENTATIONS

The present patent document is a continuation of U.S. patent application Ser. No. 15/794,397, filed Oct. 26, 2017, entitled "DYNAMIC SYSTEM AND METHOD FOR CONTENT AND TOPIC BASED SYNCHRONIZATION DURING PRESENTATIONS", the entire contents of which are incorporated herein by reference.

FIELD

Embodiments relate to dynamic systems and methods for content and topic-based synchronization during presentations.

BACKGROUND

A common way for knowledge to be transferred in a school class, seminar, web conference, etc., is for a teacher or presenter to speak about a topic and use slides having visual information as a supplement. Conventionally, the slides are transitioned from one to another by the presenter, or someone managing in the background, by pressing a button on a mouse, screen, or other controller. This can be inefficient, for example, as sometimes the user may forget to transition the slides at the appropriate time in the speech. Sometimes slide presentations can be very long, such as 50 slides or more. This can make it difficult for a user to switch between the slides when, for example, an audience member asks a question, the answer of which relates to a slide far in the queue from the currently-displayed slide. Accordingly, there exists a need for improvement in technology relating to electronic slide presentations.

SUMMARY

In one aspect, there is provided a computer-implemented method for automatic synchronization of a visual presentation comprising a plurality of slides with a verbal presentation, comprising: performing a computer-generated topic analysis for each slide of the plurality of slides; creating a topic index for the visual presentation, wherein the topic index comprises an entry for each slide, wherein each entry includes one or more topic keywords associated therewith; performing a real-time computerized natural language analysis of the verbal presentation; deriving one or more temporal verbal topic categories from the real-time computerized natural language analysis; searching the topic index for a best matching entry, based on the one or more temporal verbal topic categories; and rendering a slide from the plurality of slides that corresponds to the best matching entry.

In another aspect, there is provided an electronic communication device comprising: a processor; a memory coupled to the processor, the memory containing instructions, that when executed by the processor, perform the steps of: performing a computer-generated topic analysis for each slide from a visual presentation comprising a plurality of slides; creating a topic index for the visual presentation, wherein the topic index comprises an entry for each slide, wherein each entry includes one or more topic keywords associated therewith; performing a real-time computerized natural language analysis of a verbal presentation; deriving one or more temporal verbal topic categories from the real-time computerized natural language analysis; searching the topic index for a best matching entry, based on the one or more temporal verbal topic categories; and rendering a slide from the plurality of slides that corresponds to the best matching entry.

In yet another aspect, there is provided a computer program product for automatic synchronization of a visual presentation, for an electronic computing device comprising a computer readable storage medium having program instructions embodied therewith, the program instructions executable by a processor to cause the electronic computing device to: perform a computer-generated topic analysis for each slide from a plurality of slides; create a topic index for the visual presentation, wherein the topic index comprises an entry for each slide, wherein each entry includes one or more topic keywords associated therewith; perform a real-time computerized natural language analysis of a verbal presentation; derive one or more temporal verbal topic categories from the real-time computerized natural language analysis; search the topic index for a best matching entry, based on the one or more temporal verbal topic categories; and render a slide from the plurality of slides that corresponds to the best matching entry.

BRIEF DESCRIPTION OF THE DRAWINGS

Features of the disclosed embodiments will be more readily understood from the following detailed description of the various aspects of the invention taken in conjunction with the accompanying drawings.

FIG. 12 shows an example of a bigram analysis in accordance with embodiments of the present invention.

Figure 1:
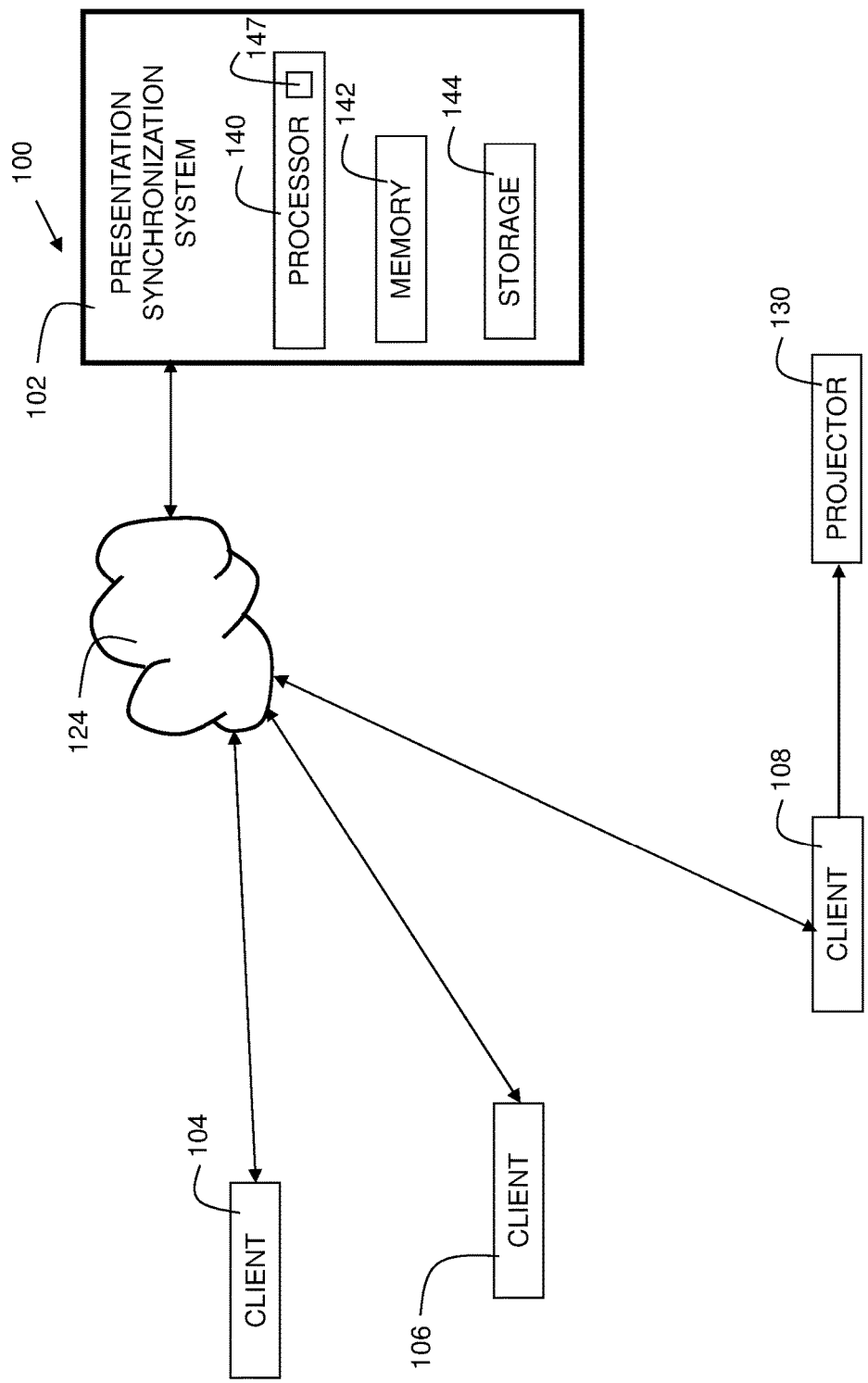
FIG. 1 is a diagram for an environment of embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for automatically synchronizing a visual presentation with a live presenter. Visual presentation slides are preprocessed to determine one or more topics for each slide. A topic index contains one or more topics corresponding to slides of the presentation. As a presenter provides a verbal presentation for corresponding slides, natural language processing analyzes the verbal presentation and creates one or more temporal verbal topic categories. The temporal verbal topic categories are used to search the topic index to find one or more slides that best match the current temporal verbal topic categories. In this way, the slides can automatically follow the discussion of the presenter, enabling improved presentations that can enhance the user experience, increase audience engagement, and improve the dissemination of information.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

FIG. 1 is a diagram 100 for an environment of embodiments of the present invention. Presentation synchronization system 102 comprises processor 140, memory 142, and storage 144. System 102 is an electronic communication device. Instructions 147 for executing embodiments of the present invention are shown stored in memory 142. Presentation synchronization system 102 is in communication with network 124. In embodiments, network 124 may be the Internet, a wide area network (WAN), a local area network (LAN), a cloud network, a combination thereof, or any other suitable network. Client devices 104, 106, and 108 are also in communication with network 124. Client device 108 is in communication with projector 130. In embodiments, a visual presentation may be rendered by projecting, using projector 130, onto a large screen or wall, and/or displaying on a computer screen of one or more of the client devices. Any suitable method of rendering is included within the scope of the present invention. Client devices may be smartphones, tablet computers, laptop computers, desktop computers, a combination thereof, or other suitable devices.

Figure 2:
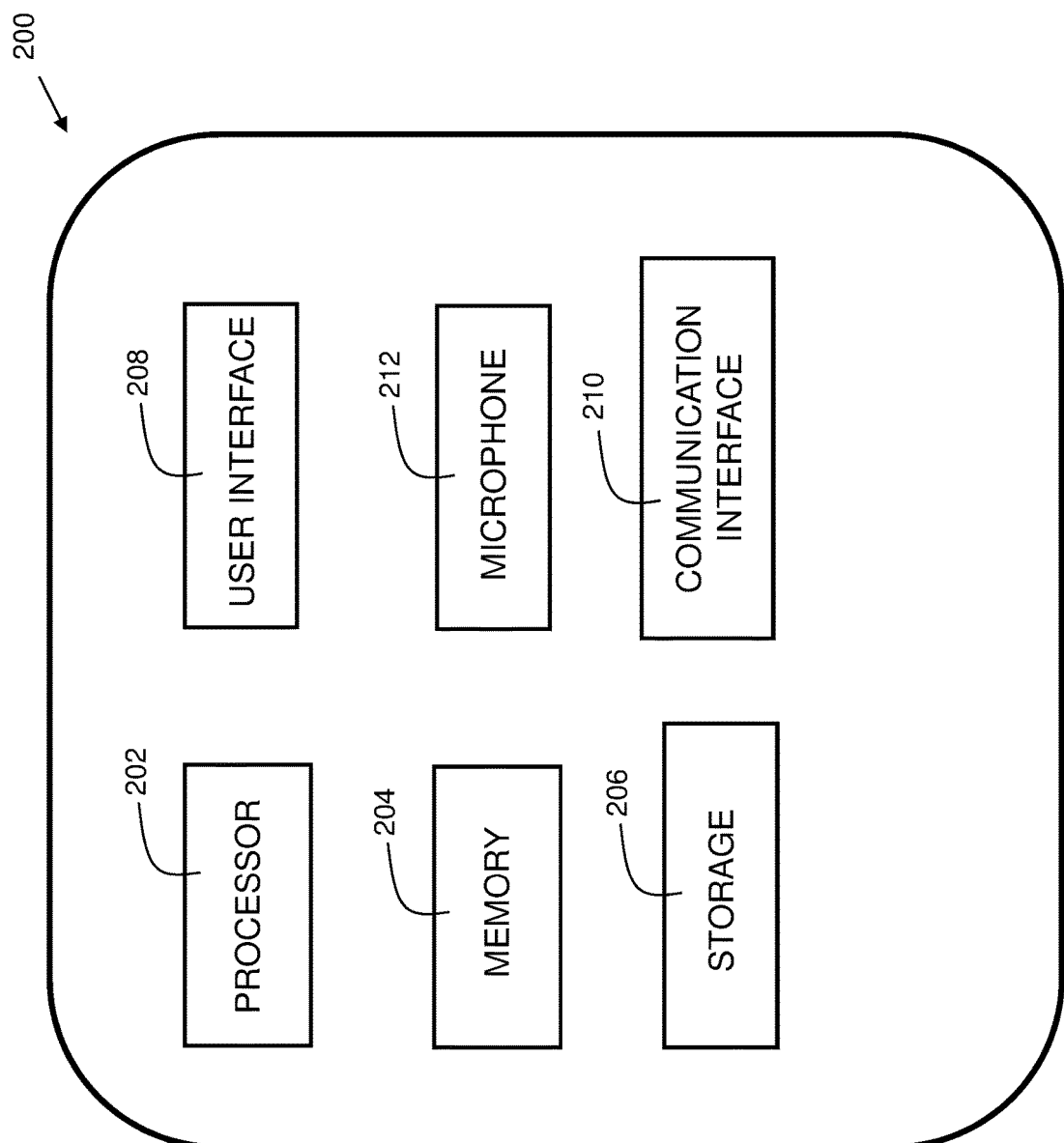
FIG. 2 is a device in accordance with embodiments of the present invention.

FIG. 2 is a device 200 in accordance with embodiments of the present invention. Device 200 is shown as a simplified diagram of modules. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include storage 206. In embodiments, storage 206 may include one or more magnetic storage devices such as hard disk drives (HDDs). Storage 206 may include one or more solid state drives (SSDs). Any other storage device may be included instead of, or in addition to, those disclosed herein.

Device 200 further includes a user interface 208. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 208 may include a keyboard, mouse, and/or a touch screen, incorporating a capacitive or resistive touch screen in some embodiments. In embodiments, the device 200 includes a microphone 212 which may be used to receive speech from a user.

The device 200 further includes a communication interface 210. In some embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

In some embodiments, the elements of the invention are executed solely on a client device. In other embodiments, the elements of the invention are executed on a server remotely from a client device. In some embodiments, some elements are executed on the client device, and others are executed on the server.

Figure 3:
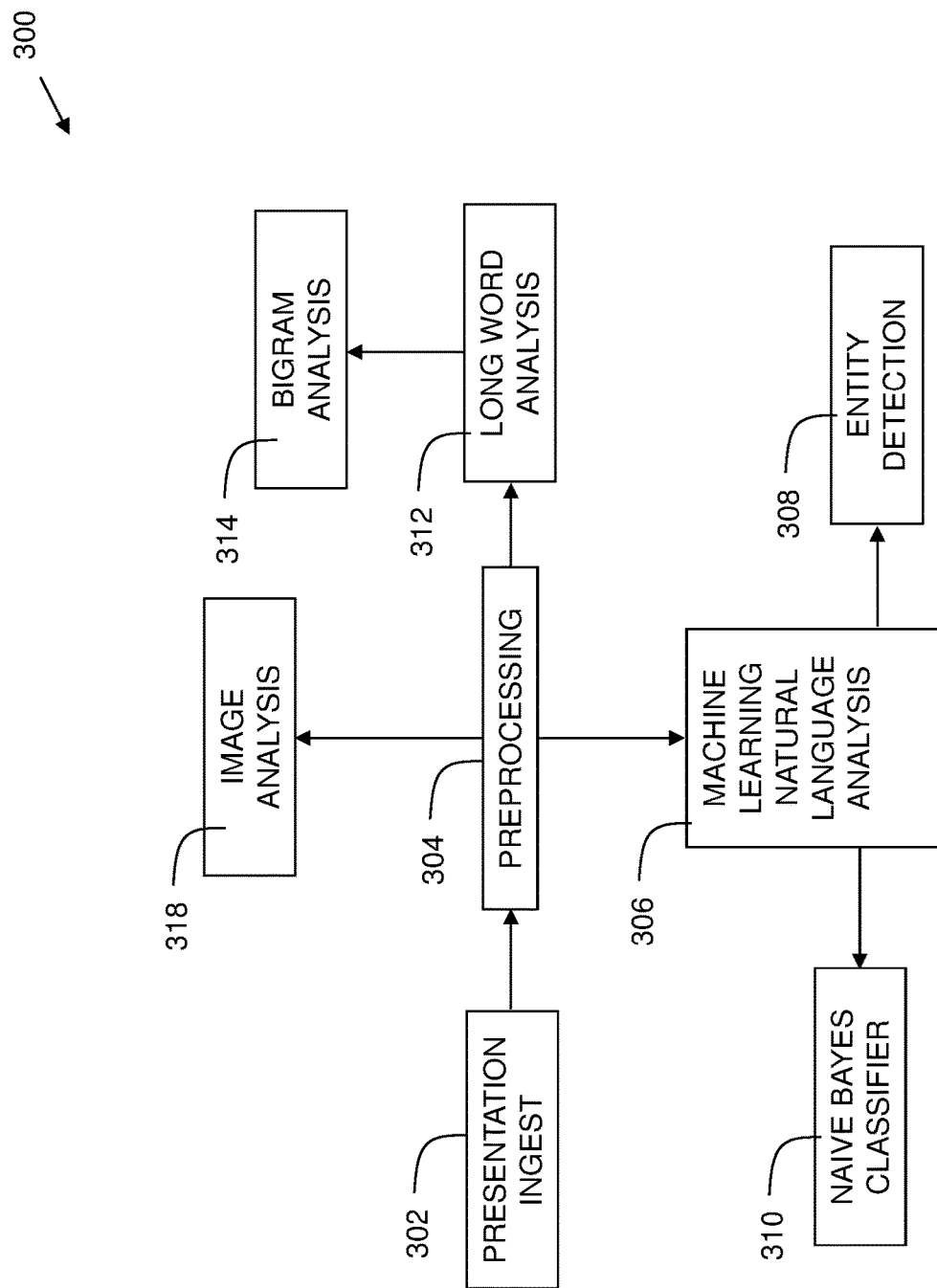
FIG. 3 is a flowchart indicating process steps for visual presentation processing in accordance with embodiments of the present invention.

FIG. 3 is a flowchart 300 indicating process steps for visual presentation processing in accordance with embodiments of the present invention. Embodiments of the invention provide a computer-implemented method for automatic synchronization of a visual presentation, comprising a plurality of slides, with a verbal presentation.

At 302, the visual presentation is ingested into system 102 (FIG. 1). The visual presentation ingest may include importing of a corpus or raw text, scraping of web pages linked to in the presentation, and/or any other suitable process.

At 304, the ingested visual presentation is then preprocessed for indexing. This includes performing a computer-generated topic analysis for each slide of the plurality of slides. A topic index, comprising at least one entry for each slide, is created for the visual presentation. Each entry includes one or more topic keywords associated therewith.

At 306, the topic analysis for each slide comprises performing a computerized natural language processing analysis of each slide of the plurality of slides. In embodiments, a real-time computerized natural language analysis of the presentation is performed. The natural language analysis may include, but is not limited to, indexing, concordance, stop word processing, bigram processing, dispersion analysis, lexical richness analysis (ratio of distinct words to total words), disambiguation, part-of-speech analysis, anaphora resolution (the process of identifying what a pronoun or noun phrase refers to), or any other suitable process.

In some embodiments, a real-time computerized natural language analysis 306 comprises performing an entity detection process 308 on text data from one or more slides from the plurality of slides. A topic is then derived based on each entity detected from the entity detection process. The derived topic and corresponding slide is recorded in the topic index. The entity detection may include extraction, which is the detection and preparation of named entity occurrences. The extraction phase includes POS (part of speech) tagging, tokenization, sentence boundary detection, capitalization rules and in-document statistics. The entity detection may further include noun identification, followed by identifying a subset of nouns including proper nouns, and nouns deemed to be topically pertinent. The extracted entities may be used as keywords to populate a topic index.

In some embodiments, the computerized natural language analysis (306 of FIG. 3) comprises performing a long word analysis at 312, which may include a bigram analysis at 314. In some embodiments, performing a computerized natural language analysis 306 comprises using a naive Bayes classifier at 310. Other classifiers and/or machine learning techniques may be used with embodiments of the present invention. In some embodiments, a regression analysis may be used to derive a correlation between verbal topics and corresponding slides of the presentation.

At 318, the topic analysis for each slide comprises performing an image analysis for an image within a slide from the plurality of slides. The image analysis may include using edge detection processes, gradient detection processes, and other suitable processes to detect and identify objects in an image. Based on the identification, one or more topic keywords may be assigned to the slide. For example, if a smiling face is detected in a slide, a keyword of "happy" may be entered as an entry for the slide in the index.

The topic index includes entries of topic keywords assigned to various slides. The index may be comprised of database tables, such as those illustrated in FIG. 13. Any suitable configuration of the index is included within the scope of the invention.

Figure 4:
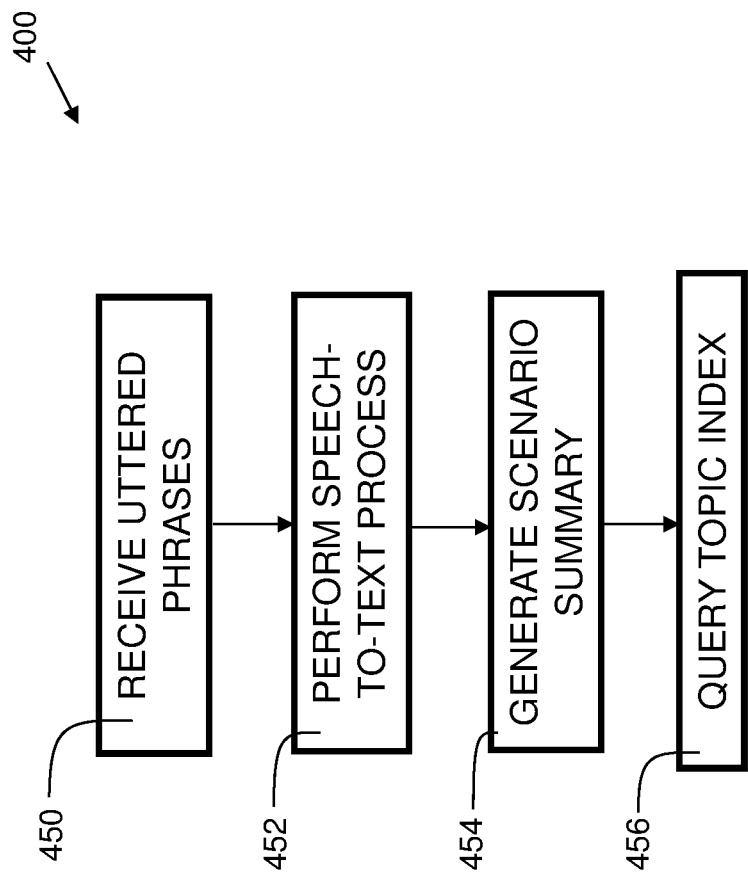
FIG. 4 is a flowchart indicating process steps for verbal presentation processing in accordance with embodiments of the present invention.

FIG. 4 is a flowchart 400 indicating process steps for verbal presentation processing in accordance with embodiments of the present invention. At block 450, uttered phrases are received from a client device, e.g., 104, 106, or 108, via a computer network 124 at the presentation synchronization system 102 (FIG. 1). The uttered phrases may be captured by a microphone, for example, microphone 212 (FIG. 2). The uttered phrases may be received in the form of a sound representation such as PCM (Pulse Code Modulated) data, a WAV file, MP3 file, compressed audio data, or other suitable audio format.

At block 452, a speech-to-text process is performed on the uttered phrase. As part of the speech-to-text process, the presentation synchronization system may perform a phoneme extraction process to extract the phonemes from the audio data. In the English language, there are 44 phonemes. Other languages may have more or fewer phonemes. For example, Spanish has 24 phonemes, while German has 45 phonemes. A variety of tools, such as CMU Sphinx, are available for performing phoneme extraction. While the examples disclosed herein use examples in English, disclosed embodiments may be adapted to operate with a variety of languages, including, but not limited to, Spanish, French, Italian, German, Portuguese, Japanese, or Chinese.

The speech-to-text process may further include performing a homonym disambiguation process. For example, some words are pronounced the same way, such as eight and ate. The homonym disambiguation process may use tokenization and part-of-speech identification to determine the most likely word that matches the phonemes. For example, if a pronoun precedes a phoneme that sounds like "eight," then the intended word is most likely to be "ate."

The speech-to-text process may consider dialects within a language. For example, in English, there are a variety of dialects (e.g., British, American, Canadian, and Australian English) which may each have a slightly different lexicon. The speech-to-text process may use the dialect in computing the probability of a phoneme or set of phonemes matching a particular word.

At block 454, a scenario summary is generated for one or more of the received uttered phrases. An entity detection process is performed to generate the scenario summary. The entity detection may include extraction, which is the detection and preparation of named entity occurrences. The extraction phase includes POS (part of speech) tagging, tokenization, sentence boundary detection, capitalization rules and in-document statistics. The entity detection may further include noun identification, followed by identifying a subset of nouns including proper nouns, and nouns deemed to be topically pertinent. The extracted entities may be used as keywords within the scenario summary. These keywords can then be used as temporal verbal topic categories which can be matched with topic keywords pertaining to a presentation. A temporal verbal topic category is a topic category pertaining to the verbal presentation over a predetermined period of time. For example, if a presenter mentions a phrase P for X number of times within the past Y seconds, then the phrase P may be considered as a temporal verbal topic category for that point in the presentation. For example, if a presenter mentioned the phrase "data compression" eight number of times within the past 20 seconds, then temporal verbal topic category of "data compression" is determined to exist. The temporal verbal topic category of "data compression" can then be used as an input to query the topic index of the slides a presentation, and retrieve an appropriate slide (e.g. slide 608 of FIG. 6).

At block 456, a topic index is queried. A query of a topic database, using the scenario summary as an input to the query, is performed to obtain one or more relevant topics based on the keywords of the scenario summary. In embodiments, the scenario summary is input to a mapping rule library, which then retrieves a topic for the scenario summary. The topic index is then searched to retrieve the slide that best represents the topic. This slide may then be rendered to the presentation audience as the presenter speaks about that topic.

Figure 5:
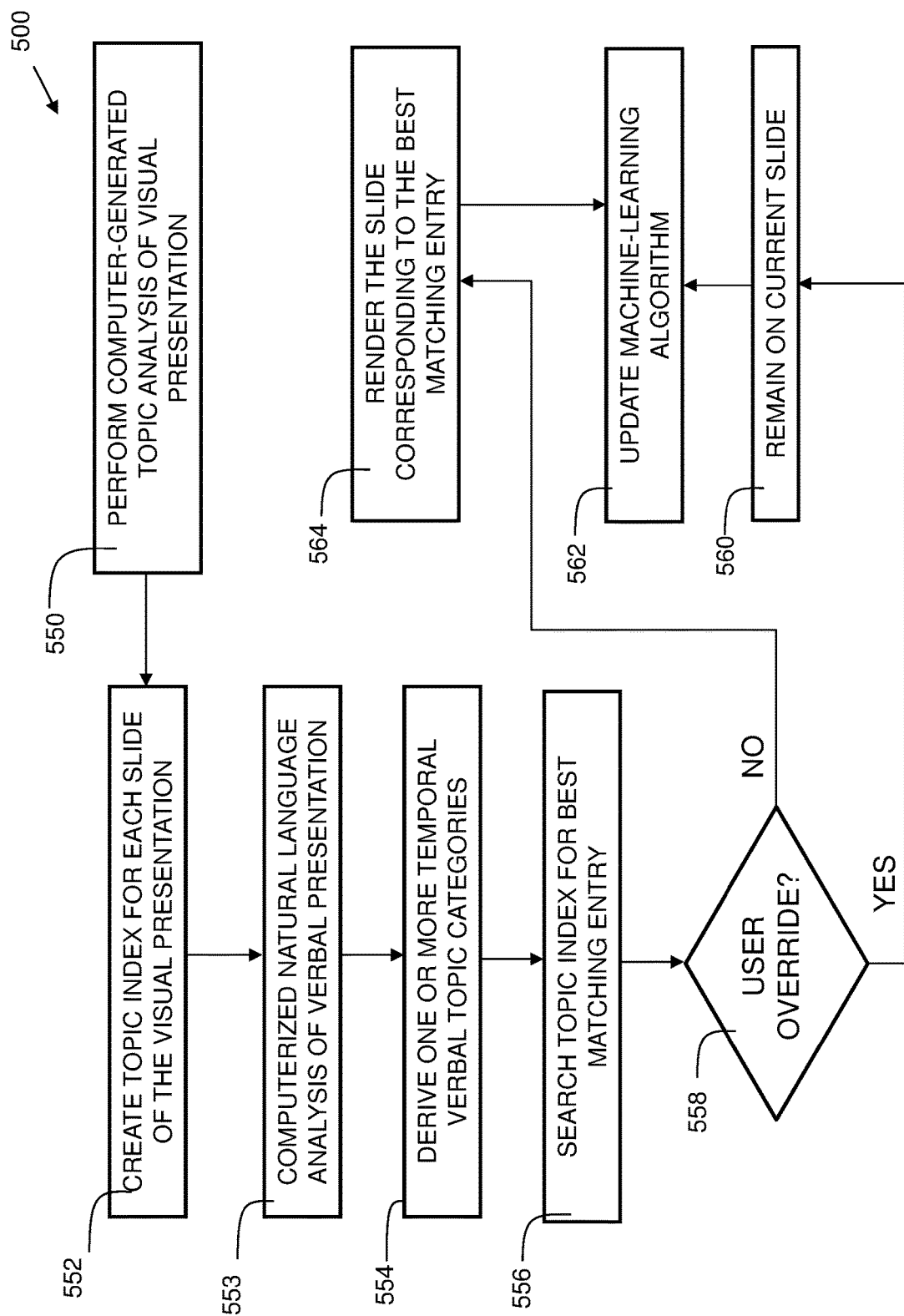
FIG. 5 is a flowchart indicating process steps for presentation synchronization in accordance with embodiments of the present invention.

FIG. 5 is a flowchart 500 indicating process steps for presentation synchronization in accordance with embodiments of the present invention. At 550, a computer-generated topic analysis is performed for each slide of the plurality of slides. At 552, a topic index, comprising an entry for each slide, for the visual presentation is created. Each entry includes one or more topic keywords associated therewith. At 553, a real-time computerized natural language analysis of a received verbal presentation is performed. At 554, one or more temporal verbal topic categories are derived from the real-time computer-generated natural language analysis. At 556, the topic index is searched for a best matching entry. The best matching entry is based on a comparison of the derived one or more temporal verbal topic categories to the topic keywords stored as entries in the topic index. The best matching entry is the slide that is then queued for transition to for rendering. At 558, an option to override the slide transition is provided to the user. Accordingly, it is determined whether a user override has been received. If not, at 564, a slide (from the plurality of slides) is rendered that corresponds to the best matching entry. At 562, a machine-learning algorithm is updated, such that the algorithm, over time, can be trained to better predict whether to remain or transition to a new slide. If a user override is received at 558, then at 560, the rendering of the current slide is maintained, and at 562, the machine-learning algorithm is updated.

Figure 6:
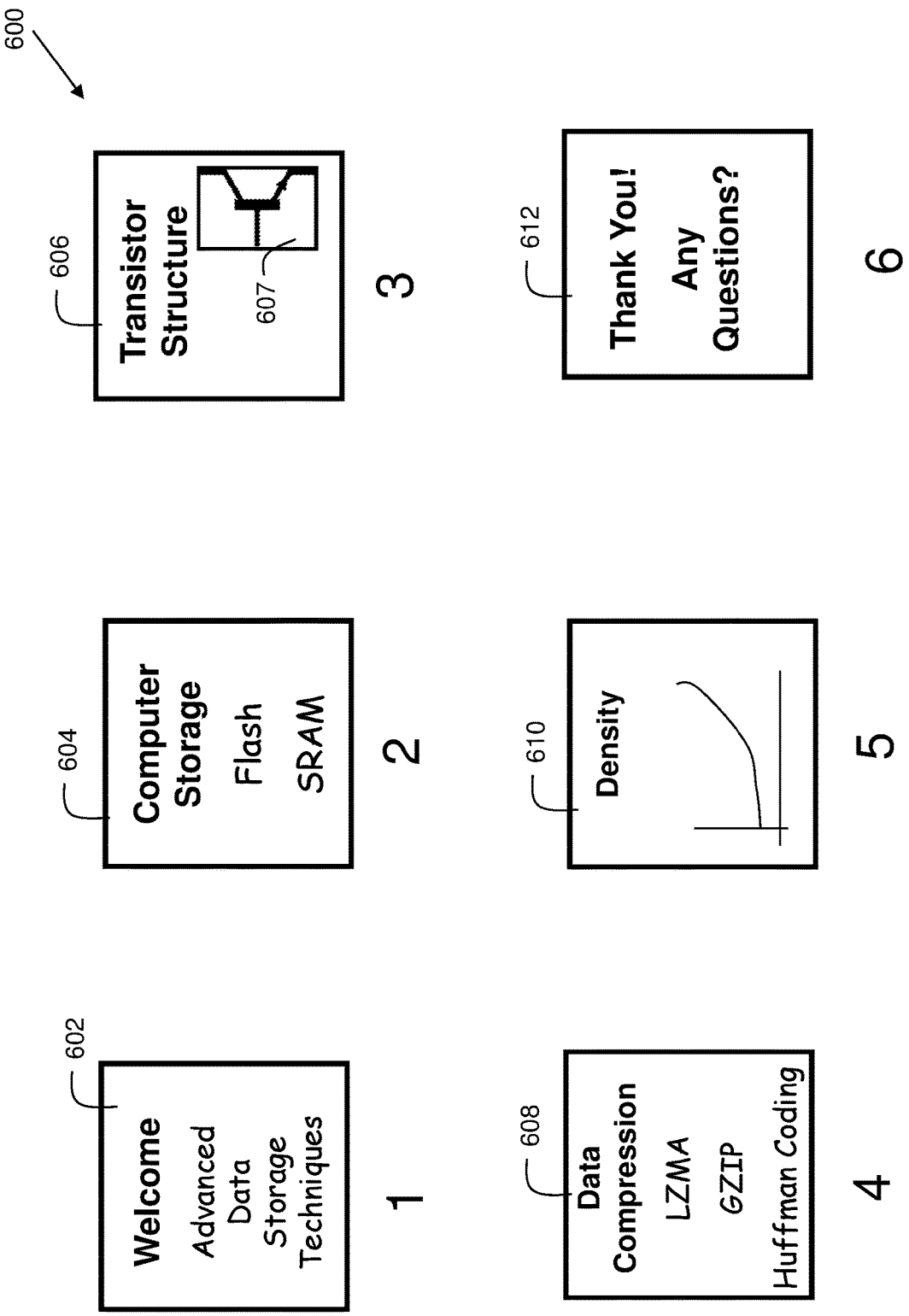
FIG. 6 is an exemplary slide presentation used to describe operation of embodiments of the present invention.

FIG. 6 is an exemplary visual slide presentation 600 used to describe operation of embodiments of the present invention. The slide presentation includes six slides—first slide 602, second slide 604, third slide 606, fourth slide 608, fifth slide 610, and sixth slide 612. They are queued by the software program to render in that order, unless a user, or system 102 (FIG. 1), intervenes. Note that rendering slides in the visual presentation may include projecting the slides onto a large screen or wall. Rendering the visual presentation may include displaying the slides on a computer screen. Any suitable method of rendering the visual presentation is included. In the example, all of the slides include words. The words are subjected to natural language analysis to detect topic keywords therefrom. The third slide includes an image 607 in addition to the text. The image 607 is analyzed by image analysis for topic keywords relevant to the detected image. The keywords are stored as entries in a topic index corresponding to the visual slide presentation.

Figure 7:
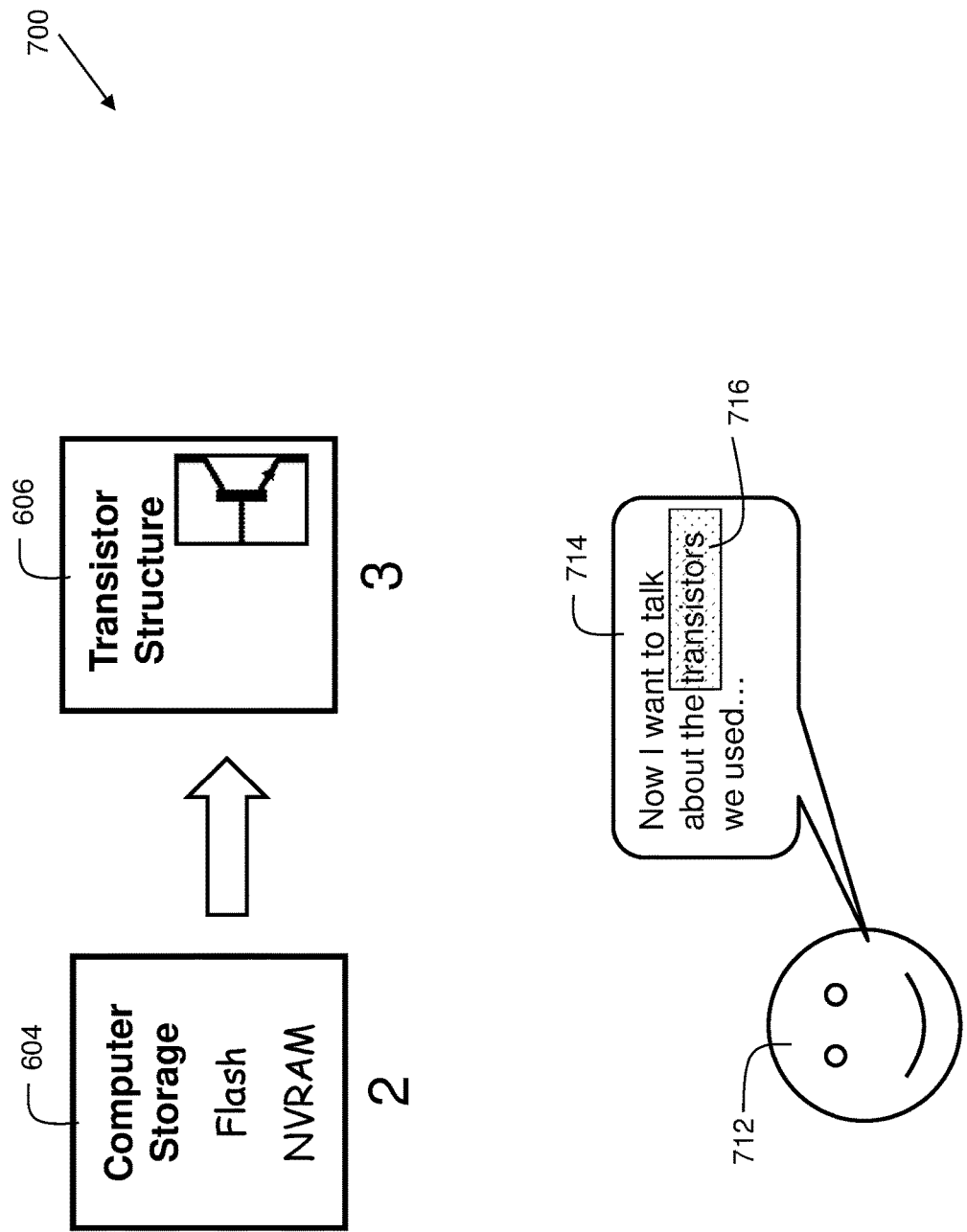
FIG. 7 shows an example of a forward slide transition based on a verbal presentation in accordance with embodiments of the present invention.

FIG. 7 shows an example 700 of a forward slide transition based on a verbal presentation in accordance with embodiments of the present invention. In the example, user 712 is speaking into a microphone 212 (FIG. 2) with slides of the visual presentation 600 of FIG. 6 being rendered on an electronic device (such as device 106 of FIG. 1). During the user's verbal presentation, the user 712 utters the phrase 714: "Now I want to talk about the transistors we used . . . ". Second slide 604 is rendered on the screen at the time that the user utters that phrase. System 102 (FIG. 1) receives and processes the verbal utterance, identifying the word 716: "transistors" as a keyword. Based on a comparison of the keyword to the topic index corresponding to visual slide presentation 600, it is determined that the third slide 606 is the best matching entry as the third slide has associated therewith the keyword of "transistor". Accordingly, system 102 (FIG. 1) transitions from rendering the second slide 604 to the third slide 606. This occurs in near real time, so it is very soon after the user 712 utters the phrase 714 that the transition is made so as to keep the slide currently being rendered relevant to the real-time verbal speech of the user 712.

Figure 8:
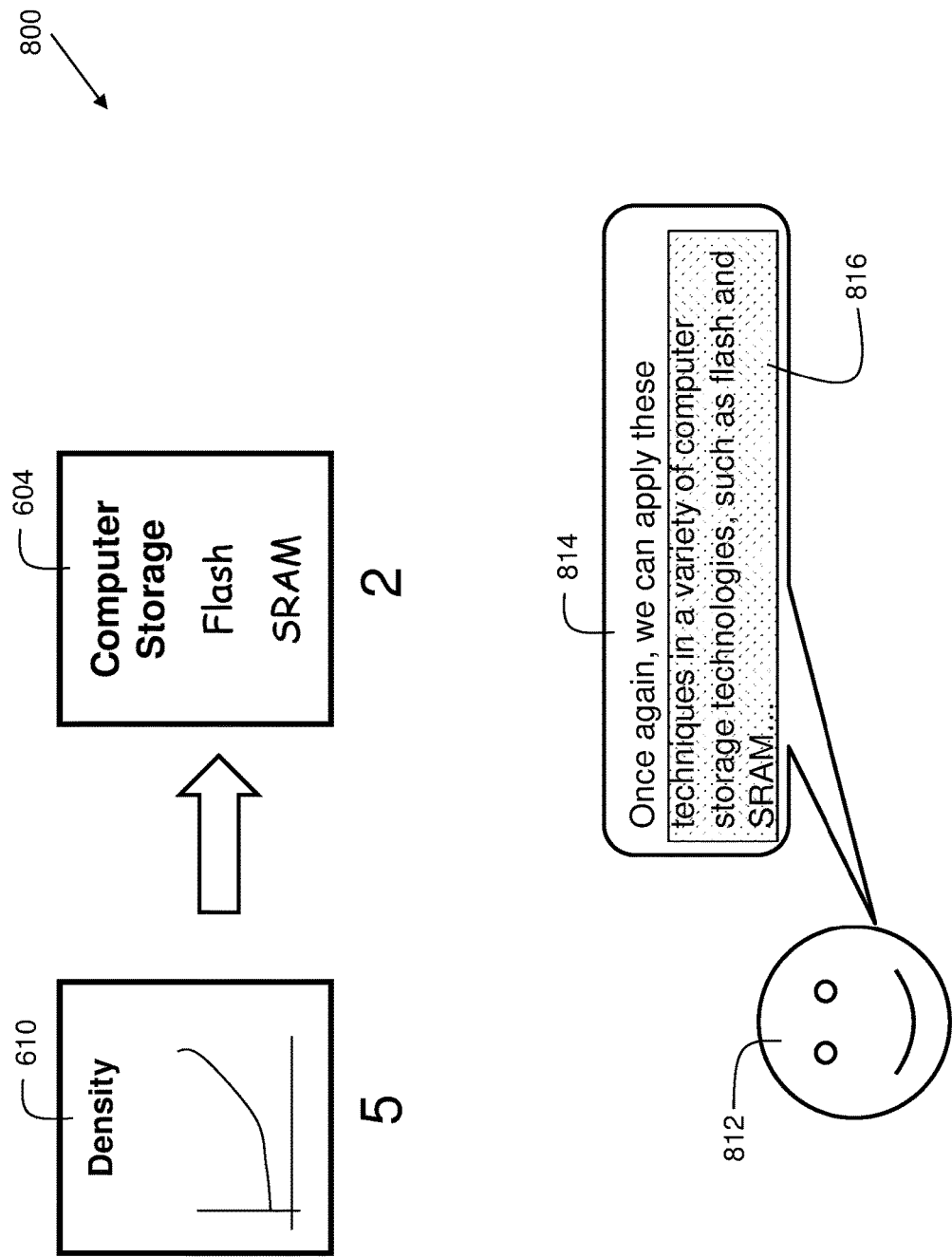
FIG. 8 shows an example of a backward slide transition based on a verbal presentation in accordance with embodiments of the present invention.

FIG. 8 shows an example 800 of a backward slide transition based on a verbal presentation in accordance with embodiments of the present invention. In some embodiments, the best matching entry may be in a slide previously shown, or "backwards" in terms of the slide order. Accordingly, the slides do not have to transition only in the forward direction (to a slide which has not yet been previously shown). Slides from earlier in the presentation can be transitioned to if the system determines such slide(s) are relevant based on the current speech in the verbal presentation of the user.

In the example 800, user 812 is speaking with slides of the visual presentation 600 of FIG. 6 being rendered on an electronic device (such as 106 of FIG. 1). During the user's verbal presentation, as captured by microphone 212 (FIG. 2), the user utters the phrase 814: "Once again, we can apply these techniques in a variety of computer storage technologies, such as flash and SRAM . . . ". Fifth slide 610 is rendered on the screen at the time that the user utters that phrase. System 102 (FIG. 1) receives and processes the verbal utterance, identifying several words in the speech, including "computer storage," "flash," and "SRAM" as keywords in section 816 of phrase 814. Based on a comparison of the detected keywords to the entries in the topic index, it is determined that the second slide 604 is the best matching entry because slide 604 has the same keywords associated therewith. Accordingly, system 102 (FIG. 1) transitions from rendering the fifth slide 610 to the second slide 604. This occurs in near real time, so it is very soon after the user utters the phrase 814 that the transition is made so as to keep the slide being projected relevant to the current verbal speech of the user 812.

Figure 9:
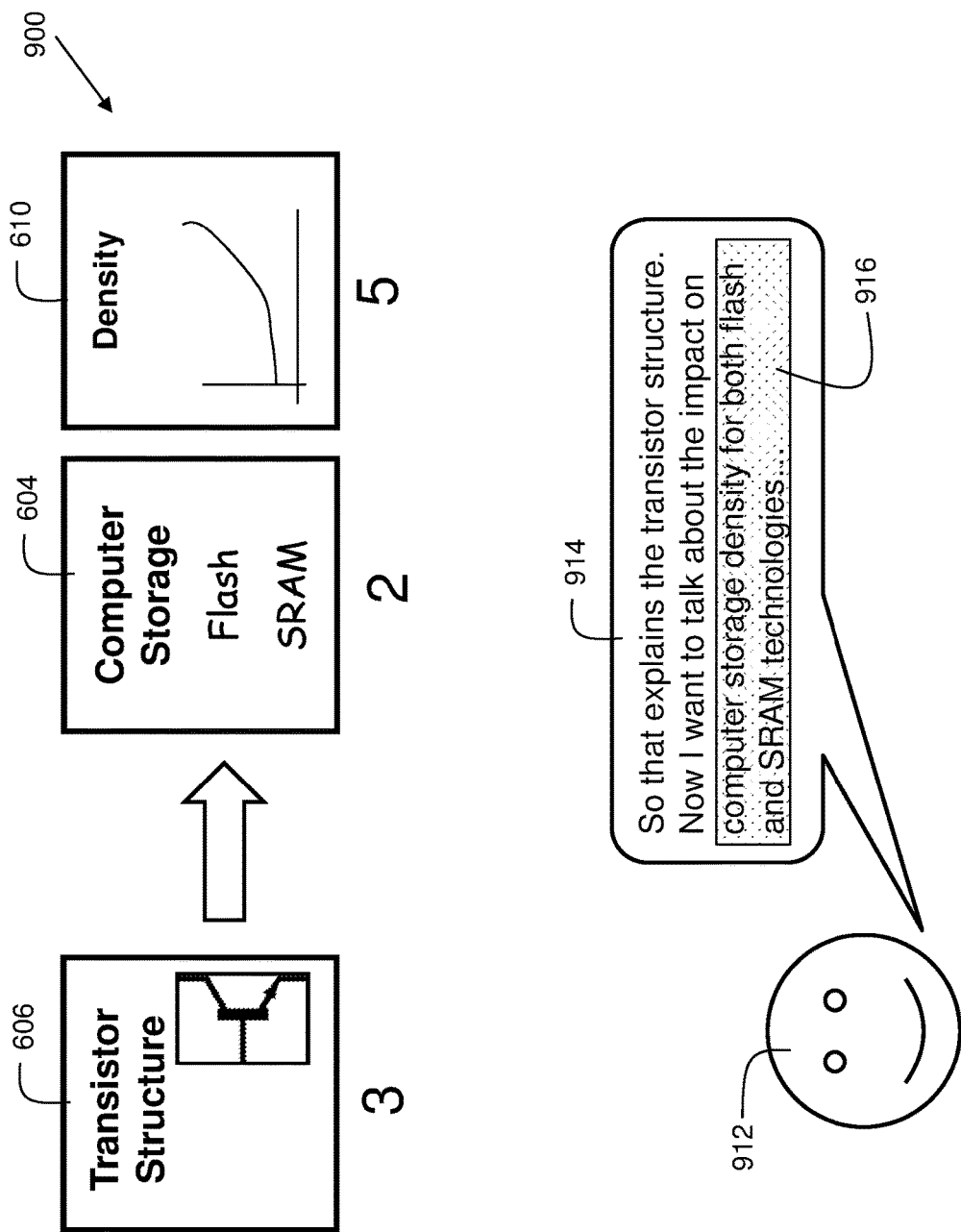
FIG. 9 shows an example of rendering multiple slides simultaneously based on a verbal presentation in accordance with embodiments of the present invention.

FIG. 9 shows an example 900 of rendering multiple slides simultaneously based on a verbal presentation in accordance with embodiments of the present invention. Some embodiments include detecting a second best matching entry (in addition to determining a best matching entry), and rendering the slide (from the plurality of slides) that corresponds to the second best matching entry adjacent to the slide that corresponds to the best matching entry. Accordingly, in some embodiments, more than one slide (two or more) may be displayed on the screen at a time.

In the example 900, user 912 is speaking with slides of the visual presentation 600 of FIG. 6 being rendered on an electronic device (such as 106 of FIG. 1). The user 912 utters the phrase 914: "So that explains the transistor structure. Now I want to talk about the impact on computer storage density for both flash and SRAM technologies . . . ". Third slide 606 is displayed on the screen at the time that the user 912 utters that phrase. System 102 (FIG. 1) receives and processes the verbal utterance, identifying several words in the speech, including "computer storage," "flash," "density," and "SRAM" as keywords. Based on the detected keywords in section 916 of phrase 914, it is determined that second slide 604 is the best matching entry, and the fifth slide 610 is the second best matching entry. Accordingly, system 102 (FIG. 1) transitions from rendering the third slide 606 to the rendering of both the second slide 604 and the fifth slide 610. This occurs in near real time, so it is very soon after the user 912 utters the phrase that the transition is made so as to keep the slide being projected relevant to the verbal speech of the verbal presentation. When a plurality of slides is displayed simultaneously, such slides may be depicted next to one another, or one above the other, or any suitable configuration.

Figure 10:
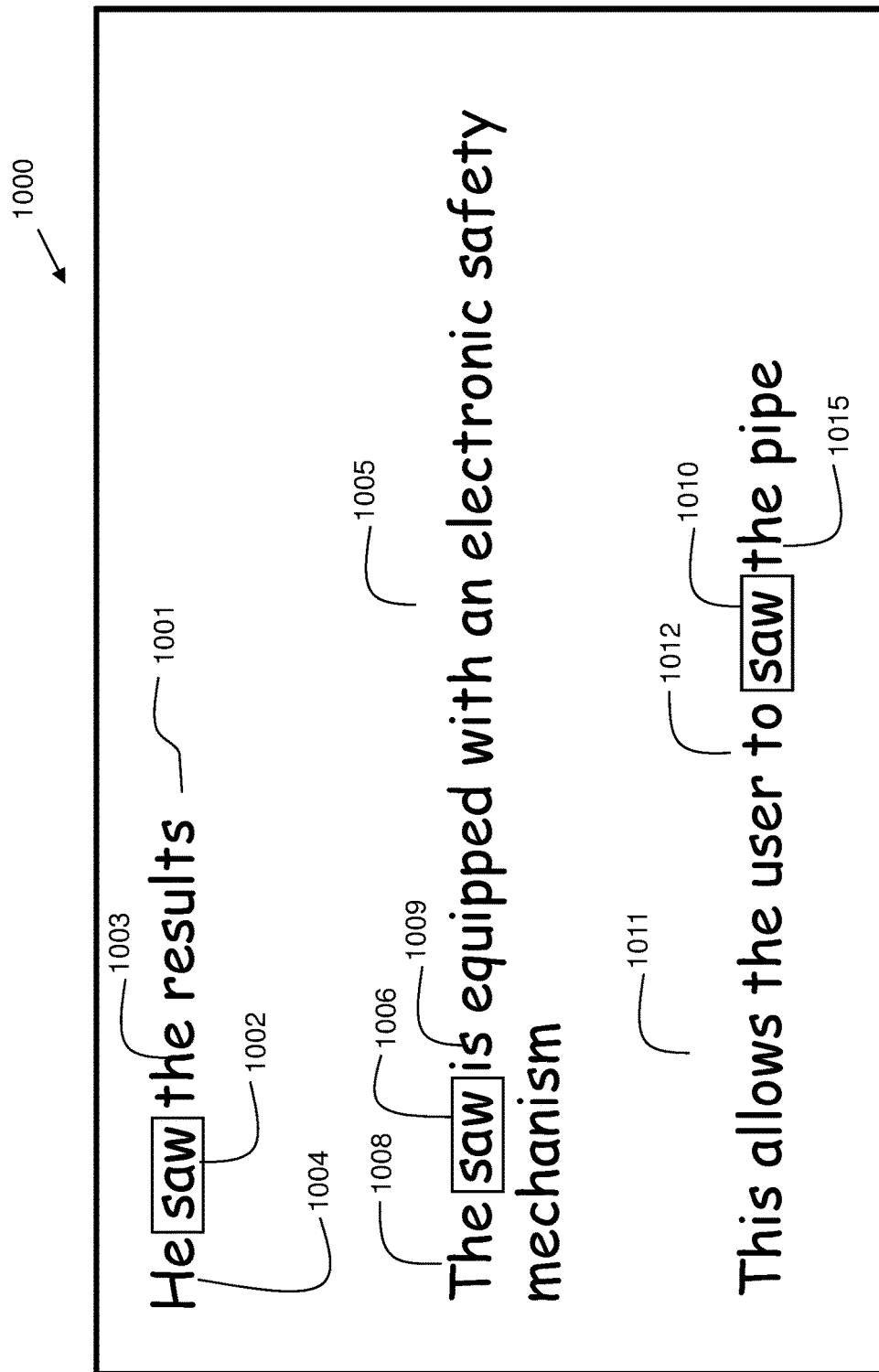
FIG. 10 shows an example of disambiguation in accordance with embodiments of the present invention.

FIG. 10 shows an example 1000 of disambiguation in accordance with embodiments of the present invention. Disambiguation is one of the computerized natural language analysis processes that may be utilized in embodiments of the present invention. As part of content ingest and analysis of the visual presentation or verbal presentation processing, text may be tokenized into words and tagged with parts of speech. For some words, there can be more than one meaning and/or part of speech.

Example 1000 shows a disambiguation example with the word "saw." In phrase 1001, the word "saw" 1002 is a past tense verb. In embodiments, a machine learning natural language analysis module may identify the prior token 1004 to the word "saw" as a pronoun, and the following token 1003 as an article. In training a classifier, the pattern of pronoun-token-article may be associated with a verb, and thus the token is interpreted as a verb.

In phrase 1005, the word "saw" 1006 is a noun for a cutting tool. In embodiments, a machine learning natural language analysis module may identify the prior token 1008 to the word saw as an article, and the following token 1009 as a verb. In training a classifier, the pattern article-token-verb may be associated with a noun, and thus the token is interpreted as a noun.

In phrase 1011, the word "saw" 1010 is an infinitive verb. In embodiments, a machine learning natural language analysis module may identify the prior token 1012 to the word "saw" as part of an infinitive form, and the following token 1015 as an article. In training a classifier, the pattern "to"-token-article may be associated with a verb, and thus the token is interpreted as a verb. These classifiers and techniques for disambiguation are examples, and other classifiers and techniques are possible.

Figure 11:
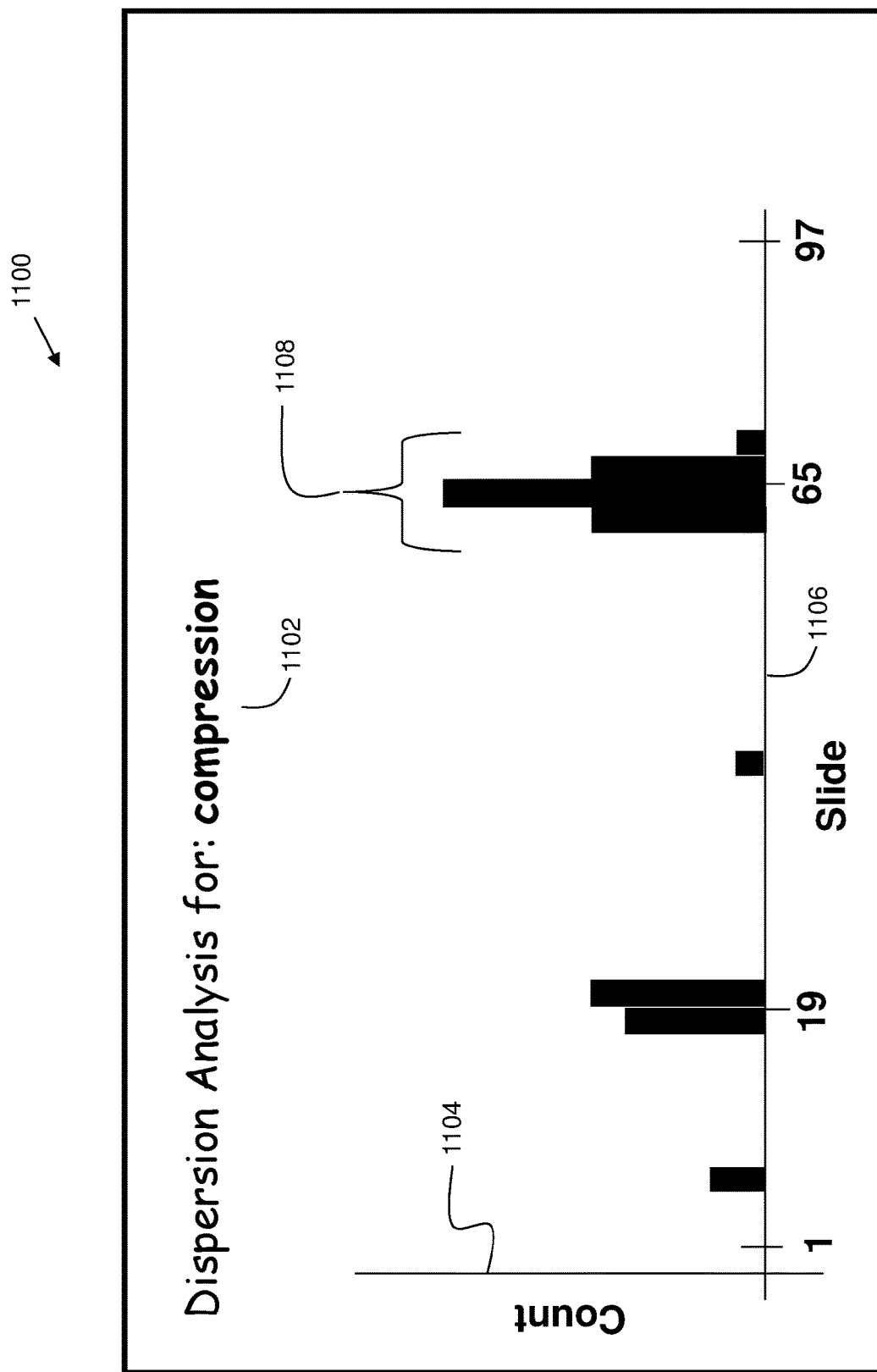
FIG. 11 shows an example of a dispersion analysis in accordance with embodiments of the present invention.

FIG. 11 shows an example 1100 of a dispersion analysis in accordance with embodiments of the present invention. In some embodiments, the performing a computerized natural language analysis (306 of FIG. 3) comprises performing a dispersion analysis. In a multiple slide presentation having 97 slides, a particular word may have a non-uniform distribution within the slide. In the example, a dispersion analysis is performed for the word "compression" 1102 within the slides of the presentation. A graph comprises a horizontal axis 1106 representing a slide number within the presentation, and a vertical axis 1104 representing a number of occurrences of word 1102 in the presentation. As can be seen in the graph, the presence of the word 1102 is concentrated in certain slides. A maximum concentration 1108 is identified in the area around slide 65. In embodiments, slides in proximity to the maximum concentration of the dispersion analysis have the word 1102 loaded into the respective topic indexes. The dispersion analysis can provide an indication of relevance. In the example 1100, the keyword (category) 1102 is "compression." Thus, in this example, using the word "compression," and keywords in the topic index relating to slides at or near slide 65 are deemed relevant, then the slides at or near slide 65 may be selected to match the verbal phrases currently uttered by a presenter.

FIG. 12 shows an example 1200 of a bigram analysis in accordance with embodiments of the present invention. In some embodiments, the topic analysis for each slide comprises a long word analysis (312 of FIG. 3). The long word analysis may include performing a bigram analysis (314 of FIG. 3). In a bigram analysis, a pair of words in a particular order may be searched for within a body of text of an input query and/or a verbal utterance. Based on the analyses, one or more topic keywords may be assigned to the slide. In this example, the bigram "computer storage" is searched within a text excerpt. Three occurrences, indicated as 1202A, 1202B, and 1202C are present in the text passage. In embodiments, the usage of bigrams, trigrams, or more generally, n-grams (number=n), may be used to improve relevance in searching the text of a presentation and/or processing the verbal language uttered by a presenter.

Figure 13:
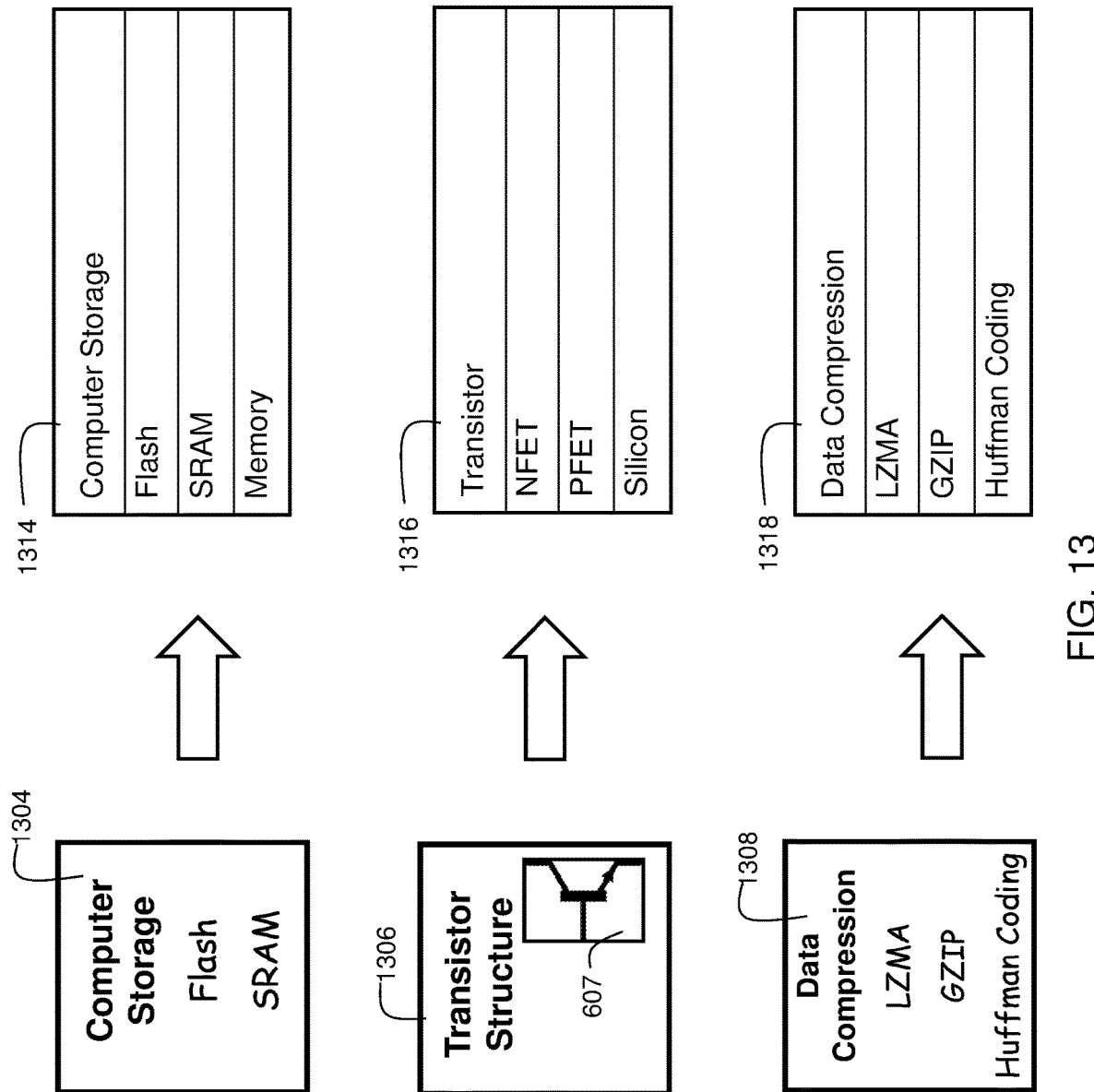
FIG. 13 shows examples of entries in a topic index for a visual presentation.

FIG. 13 shows examples of entries in a topic index for a visual presentation. In the example, the topic index comprises database tables including topic keywords from slides on the right that are inferred based on context from natural language processing or determined from image analysis of images on the slides. Database table 1314 stores the keywords detected from slide 1304. The keywords include "Computer Storage," "Flash," "SRAM", and "Memory." Database table 1316 stores the keywords detected from slide 1306. The keywords include "Transistor," "NFET," "PFET" and "Silicon." Database table 1318 stores the keywords detected from slide 1308. The keywords include "Data Compression," "LZMA," "GZIP," and "Huffman Coding." The database tables may be stored in system 102 (FIG. 1), or completely or partially on a client device 104, 106, or 108. The database tables may be relational from SQL, hierarchical, or any other suitable configuration.

Figure 14:
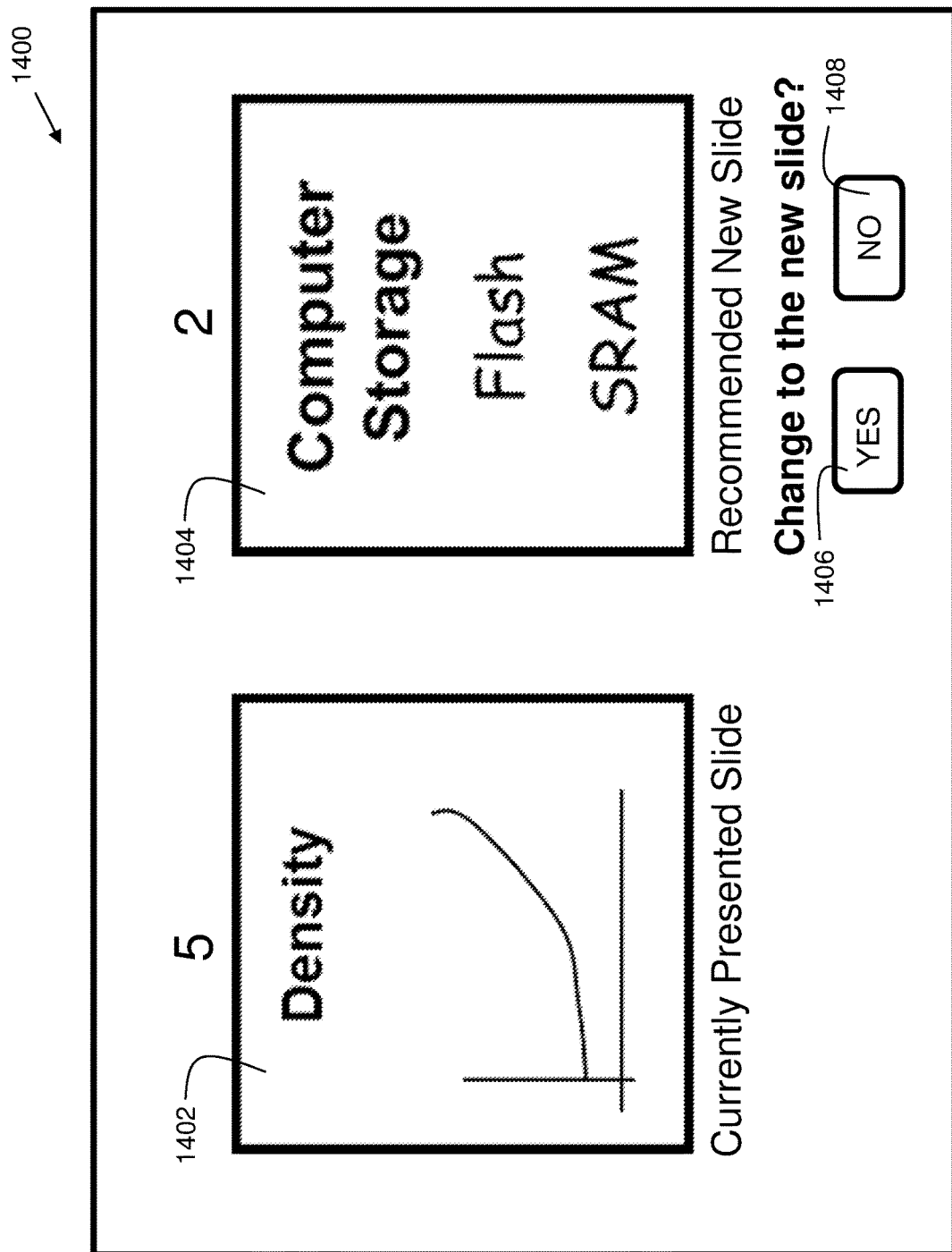
FIG. 14 shows an exemplary user interface for a web-conferencing embodiment of the present invention.

FIG. 14 shows an exemplary user interface 1400 for a web-conferencing embodiment of the present invention. In this example, the presentation is a web conference, and slides are rendered by displaying on a computer screen (user interface) of "attendee" client devices (such as 104, 106, and 108 of FIG. 1). In the example, the user interface 1400 is the controlling user interface. This is the screen of the electronic device of the presenting user or other person managing the slides in real time, and presents the currently displayed slide, the slide corresponding to the best matching entry, and an override option. Fifth slide 1402 is indicated as currently displayed. Second slide 1404 is determined as the best matching entry as the presenting user speaks. Accordingly, system 102 (FIG. 1) indicates that it is recommended that a transition to the second slide 1404 be performed. The user override option is presented as a question: "Change to the new slide" with a set of buttons 1406 and 1408 by which the user can indicate "yes" or "no," respectively. If the user answers, "no," the transition recommendation is overridden. If the user answers "yes," the transition is implemented. It should be recognized that any suitable mechanism by which to accept a user override is included within the scope of the invention.

Embodiments of the present invention improve the technical field of electronic communication. Using techniques of disclosed embodiments, improved synchronization of visual presentation material and live speaker discussion is achieved. By improving synchronization, errors in slide presentation are reduced, which enables the overall length of a presentation to be reduced. This saves energy on projectors, mobile devices, servers, and other associated equipment used for presentations. Furthermore, for web-conferencing embodiments, a savings in network resources is also achieved.

As can now be appreciated, disclosed embodiments provide techniques for automatically synchronizing a visual presentation with a live presenter. Visual presentation slides are preprocessed to determine one or more topics for each slide. A topic index contains one or more topics corresponding to slides of the presentation. As a presenter provides a verbal presentation (i.e. a discussion) for corresponding slides, natural language processing analyzes the verbal presentation and creates one or more temporal verbal topic categories. The temporal verbal topic categories are used to search the topic index to find one or more slides that best match the current temporal verbal topic categories. In this way, the slides can automatically follow the discussion of the presenter, enabling improved presentations that can enhance the user experience, increase audience engagement, and improve the dissemination of information. Machine learning techniques with user feedback mechanisms can be used to improve accuracy of the system over time. Furthermore, in addition to slide presentations, other types of visual presentations may be used in some embodiments, including, but not limited to, video clips, software demonstrations, video gaming applications, and/or tutorials.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. An electronic communication device comprising:
   a processor;
   a memory coupled to the processor, the memory containing instructions, that when executed by the processor, perform the steps of:
   performing a computer-generated topic analysis for each slide from a visual presentation comprising a plurality of slides;
   creating a topic index for the visual presentation, wherein the topic index comprises an entry for each slide, wherein each entry includes one or more topic keywords associated therewith;
   performing a real-time computerized natural language analysis of a verbal presentation;
   deriving one or more temporal verbal topic categories from the real-time computerized natural language analysis;
   searching the topic index for a first best matching entry, based on the one or more temporal verbal topic categories;
   rendering a first slide from the plurality of slides that corresponds to the first best matching entry;
   searching the topic index for a second best matching entry, based on the one or more temporal verbal topic categories; and
   rendering a second slide from the plurality of slides that corresponds to the second best matching entry adjacent to the first slide, wherein the first slide and second slide are displayed simultaneously.

2. The electronic communication device of claim 1, wherein the memory further comprises instructions, that when executed by the processor, perform a computerized natural language processing analysis of each slide of the plurality of slides.

3. The electronic communication device of claim 2, wherein performing a computerized natural language analysis comprises performing a dispersion analysis.

4. The electronic communication device of claim 1, wherein the memory further comprises instructions, that when executed by the processor, perform an image analysis for an image within a slide from the plurality of slides.

5. The electronic communication device of claim 1, wherein the memory further comprises instructions, that when executed by the processor, perform the steps of:
   performing an entity detection process on text data from one or more slides from the plurality of slides;

deriving a topic based on each entity detected from the entity detection process; and recording the derived topic and corresponding slide in the topic index.

6. The electronic communication device of claim 1, wherein the memory further comprises instructions, that when executed by the processor, perform a long word analysis.

7. The electronic communication device of claim 1, wherein the memory further comprises instructions, that when executed by the processor, perform a bigram analysis.

8. The electronic communication device of claim 1, wherein the memory further comprises instructions, that when executed by the processor, perform a computerized natural language analysis process using a naive Bayes classifier.

9. A computer program product for automatic synchronization of a visual presentation, for an electronic computing device comprising a computer readable storage medium having program instructions embodied therewith, the program instructions executable by a processor to cause the electronic computing device to:

perform a computer-generated topic analysis for each slide from a plurality of slides;

create a topic index for the visual presentation, wherein the topic index comprises an entry for each slide, wherein each entry includes one or more topic keywords associated therewith;

perform a real-time computerized natural language analysis of a verbal presentation;

derive one or more temporal verbal topic categories from the real-time computerized natural language analysis;

search the topic index for a first best matching entry, based on the one or more temporal verbal topic categories;

render a first slide from the plurality of slides that corresponds to the first best matching entry;

search the topic index for a second best matching entry, based on the one or more temporal verbal topic categories; and render a second slide from the plurality of slides that corresponds to the second best matching entry adjacent to the first slide, wherein the slide and second slide are displayed simultaneously.

10. The computer program product of claim 9, wherein the computer readable storage medium further comprises program instructions executable by a processor to cause the electronic computing device to, perform a computerized natural language processing analysis of each slide of the plurality of slides.

11. The computer program product of claim 10, wherein performing a computerized natural language analysis comprises performing a dispersion analysis.

12. The computer program product of claim 9, wherein the computer readable storage medium further comprises program instructions executable by a processor to cause the electronic computing device to:

perform an entity detection process on text data from one or more slides from the plurality of slides;

derive a topic based on each entity detected from the entity detection process; and record the derived topic and corresponding slide in the topic index.

13. The computer program product of claim 9, wherein the computer readable storage medium further comprises program instructions executable by a processor to cause the electronic computing device to:

perform an image analysis for an image within a slide from the plurality of slides.

14. The computer program product of claim 9, wherein the computer readable storage medium further comprises program instructions executable by a processor to cause the electronic computing device to:

perform a long word analysis.

15. The computer program product of claim 9, wherein the computer readable storage medium further comprises program instructions executable by a processor to cause the electronic computing device to:

perform a bigram analysis.

16. The computer program product of claim 9, wherein the computer readable storage medium further comprises program instructions executable by a processor to cause the electronic computing device to:

perform a computerized natural language analysis process using a naive Bayes classifier.

* * * * *